US008849945B1

(12) United States Patent
Desjardins et al.

(10) Patent No.: US 8,849,945 B1
(45) Date of Patent: Sep. 30, 2014

(54) ANNOTATING CONTENT WITH INTERACTIVE OBJECTS FOR TRANSACTIONS

(75) Inventors: Chad E. Desjardins, Seattle, WA (US); Russell A. Dicker, Seattle, WA (US); Cameron S. Janes, Seattle, WA (US); Roy F. Price, Seattle, WA (US); Ameesh Paleja, Lynnwood, WA (US); Ethan Z. Evans, Snoqualmie, WA (US); William D. Carr, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 721 days.

(21) Appl. No.: 12/273,950

(22) Filed: Nov. 19, 2008

Related U.S. Application Data

(63) Continuation-in-part of application No. 11/277,688, filed on Mar. 28, 2006.

(60) Provisional application No. 60/989,185, filed on Nov. 20, 2007.

(51) Int. Cl.
| | |
|---|---|
| *G06F 15/16* | (2006.01) |
| *H04N 21/433* | (2011.01) |
| *H04N 21/431* | (2011.01) |
| *H04N 21/262* | (2011.01) |
| *H04N 21/234* | (2011.01) |
| *H04N 5/272* | (2006.01) |
| *G06F 17/30* | (2006.01) |

(52) U.S. Cl.
CPC ....... *H04N 21/4331* (2013.01); *H04N 21/4316* (2013.01); *H04N 21/26241* (2013.01); *H04N 21/23424* (2013.01); *H04N 5/2723* (2013.01); *G06F 17/30064* (2013.01); *G06F 17/30882* (2013.01)
USPC ............. 709/217; 709/218; 709/219; 725/32; 725/34; 725/35; 725/112; 725/113

(58) Field of Classification Search
CPC .......... H04N 21/4331; H04N 21/4316; H04N 21/26241; H04N 5/2723; G06F 17/30064; G06F 17/30882; G06F 17/30525; G06F 17/241
USPC .......... 709/217, 218, 219; 725/32, 34, 35, 62, 725/112, 113
See application file for complete search history.

(56) References Cited

U.S. PATENT DOCUMENTS

| | | | |
|---|---|---|---|
| 5,649,171 | A | 7/1997 | Craven et al. |
| 5,694,163 | A | 12/1997 | Harrison |

(Continued)

OTHER PUBLICATIONS

Google Patent Search.*

(Continued)

*Primary Examiner* — Arvin Eskandarnia
(74) *Attorney, Agent, or Firm* — Lee & Hayes, PLLC

(57) ABSTRACT

Adding interactive objects to content having a timeline at user-identified positions in the timeline. During subsequent rendering of the content, the interactive objects are presented to a user at the identified positions. The interactive objects represent an opportunity for the user to render additional content or perform a transaction. In an embodiment, compensation is generated as a result of performance of the transaction.

29 Claims, 13 Drawing Sheets

(56) References Cited

U.S. PATENT DOCUMENTS

| | | | |
|---|---|---|---|
| 6,029,141 | A | 2/2000 | Bezos et al. |
| 7,139,813 | B1* | 11/2006 | Wallenius ............... 709/219 |
| 2002/0069218 | A1* | 6/2002 | Sull et al. ............... 707/501.1 |
| 2002/0120925 | A1 | 8/2002 | Logan |
| 2002/0193895 | A1 | 12/2002 | Qian et al. |
| 2003/0234806 | A1 | 12/2003 | Toyama et al. |
| 2003/0237091 | A1 | 12/2003 | Toyama et al. |
| 2005/0091694 | A1 | 4/2005 | Rambo |
| 2007/0044010 | A1* | 2/2007 | Sull et al. ............... 715/500.1 |
| 2007/0157228 | A1* | 7/2007 | Bayer et al. ............... 725/34 |
| 2010/0058220 | A1* | 3/2010 | Carpenter ............... 715/772 |

OTHER PUBLICATIONS

Google Patents Search.*

Mike Abundo, http://www.insideonlinevideo.com/2008/02/29/amazon-video-widget-should-be-an-overlay/, Feb. 29, 2008.

"Watch Free, Live Internet Television—The ManiaTV! Network," http://www.maniatv.com, retrieved from Internet on Sep. 8, 2005, 3 pages.

"VH1.com Shows: Pop-Up Video : Main Page," http://www.vh1.com/shows/dyn/pop_up_video/series.jhtml, retrieved from Internet on Sep. 8, 2005, 2 pages.

* cited by examiner

FIG. 8

Embed this video:

Paste this HTML into your
blog or website to share this
guide with others.

```
<iframe src="http://xyz.net/annotatedvideo.avi"
width="380" height="480"
style="border: 0px solid white;">
</iframe>
```

FIG. 9

| Video | | Status |
|---|---|---|

My Video Buying Guide

You have 1 video being processed. Processing usually takes a few minutes to an hour, but can take up to 1 day. Come back later to check on processing status.

You have 1 video that has failed to process.

You have 3 videos ready for product link additions.

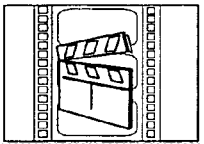  Documentary video
Uploaded on 07/07/07
Delete
⊙ Processing Failed

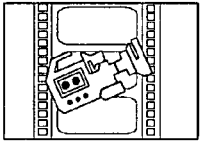  Action video
Uploaded on 07/07/07
⟳ Processing

  Family video
Uploaded on 07/07/07
Delete
[ Add products ▷ ]

  Sports video
Uploaded on 07/07/07
Delete
[ Add products ▷ ]

  Party video
Uploaded on 07/07/07
Delete
[ Add products ▷ ]

ANNOTATING CONTENT WITH INTERACTIVE OBJECTS FOR TRANSACTIONS

CROSS-REFERENCE TO RELATED APPLICATIONS

This application claims the benefit of U.S. provisional patent application Ser. No. 60/989,185, filed Nov. 20, 2007, and is a continuation-in-part of U.S. patent application Ser. No. 11/277,688, filed Mar. 28, 2006, the entire disclosures of which are hereby incorporated by reference herein for all purposes.

BACKGROUND

Existing systems enable users to edit content. For example, existing video editors provide functionality for editing a video stream by enabling the users to add transitions (e.g., fade in), add text, and cut and splice content, among other functions. However, the editing functions available in the existing systems are limited and do not include, for example, the ability to provide user-defined opportunities for interaction with a viewer at user-specified times during playback of the content.

BRIEF DESCRIPTION OF THE DRAWINGS

FIG. 8 is an example portion of a graphical user interface illustrating a hyperlink to annotated content for inclusion in a web page.

FIG. 9 is an example portion of a graphical user interface illustrating the status of video content uploaded to an annotation service.

Corresponding reference characters indicate corresponding parts throughout the drawings.

DETAILED DESCRIPTION

Figure 1:
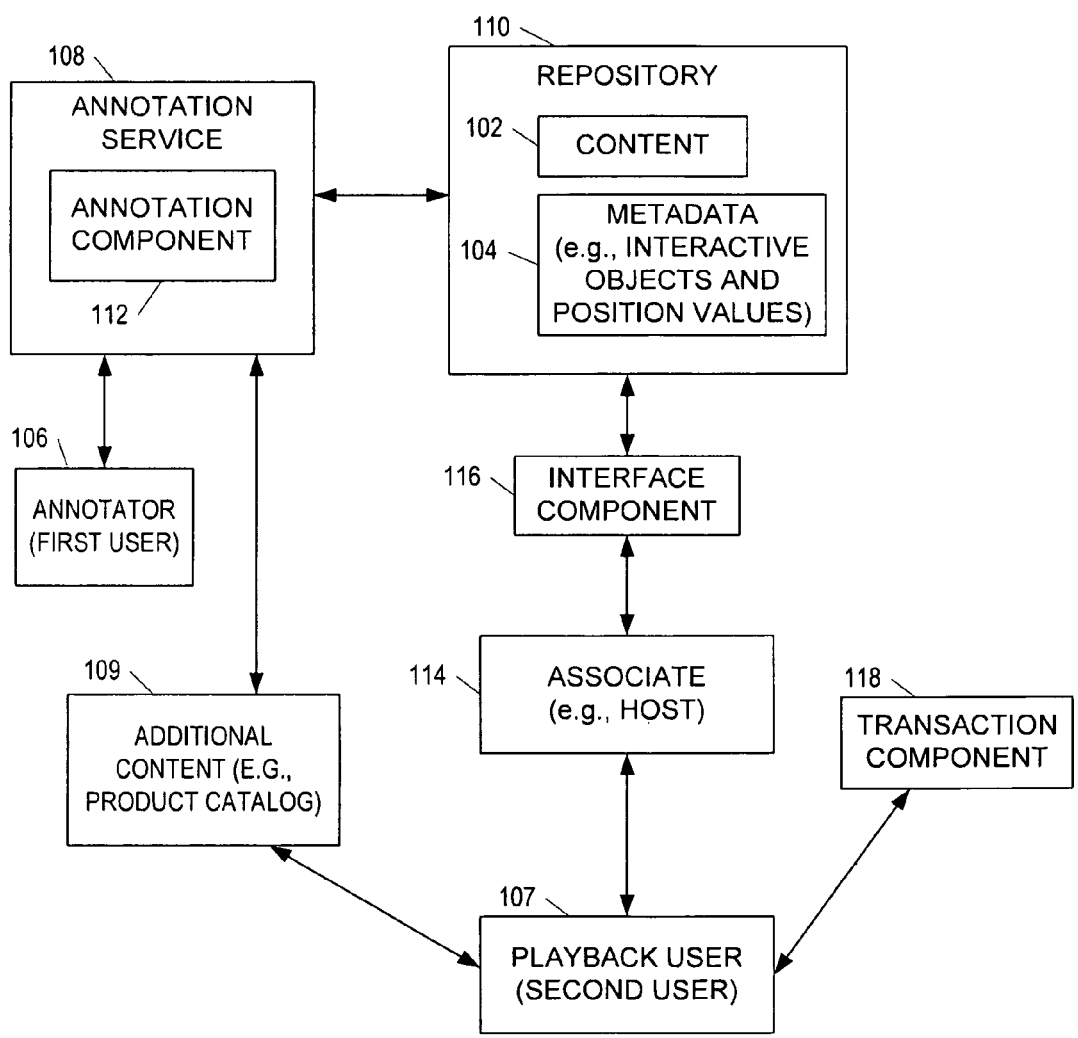
FIG. 1 is an example block diagram illustrating the interaction between an annotation service, a repository, and various users.

Disclosed embodiments enable the annotation of content 102 with interactive objects and other metadata 104 such as illustrated in FIG. 1. The content 102 includes time-based content or other sequences of content including, for example, video content, audio content, or a sequence of still images. The interactive objects are associated with the content 102 at positions therein identified by an annotator 106 or other user (e.g., a first user). During rendering of the content 102, the interactive objects are presented to a rendering user (e.g., playback user 107) at the identified positions. Rendering the content 102 includes reproduction, or providing for reproduction, of the content 102. For example, rendering includes, without limitation, providing video for display, displaying video, or playing audio. The interactive objects represent an opportunity for the rendering user to render additional content 109. For example, the additional content 109 corresponds to a product purchase opportunity, a financial transaction opportunity, an advertisement impression, a redirection to a particular web page, or any other conversion that is deemed by a party to have value. In an embodiment, the interactive objects correspond to purchase opportunities for products associated with the content 102. The interactive objects include hyperlinks to products available for purchase from an electronic product catalog, or links to other sellers including merchants and individuals (e.g., a hyperlink such as "contact the seller"). The hyperlinks are provided to the rendering user at the identified positions within the content 102. For example, a hyperlink to a particular product may appear in video content at the time that the product appears in the video content.

Further embodiments enable monetization of the annotated content 102. For example, videos may be annotated with products available for sale in an electronic catalog. As described in detail below, products selected and purchased by the rendering user via the annotated content 102 generate revenue that is shared among the parties responsible for the generation and/or hosting of the annotated content.

Referring again to FIG. 1, an example block diagram illustrates the interaction between an annotation service 108, a repository 110, and various users. The annotator 106 (e.g., a first user) interacts with the annotation service 108 to annotate the content 102. As will be described in more detail below, content 102 may have been previously provided by annotator 106, among other possibilities. The content 102 has an associated timeline with a plurality of positions each corresponding to a portion of the content 102. The positions may be time-based (e.g., an absolute time value or relative offset from the beginning of the content 102) or based on other divisions such as a cumulative amount of memory consumed by the content 102 at each of the positions. Differing granularities of the positions are contemplated and dependent, for example, upon the capabilities on a device or software reproducing the content 102. In a video embodiment, the portion of the content 102 is a video frame.

The annotation service 108 includes, for example, a web-based service having one or more computer-readable media storing computer-executable components or instructions for annotating the content 102. In the example of FIG. 1, an annotation component 112 receives from the annotator 106 a selection of the content 102, possibly among other content available for annotation in repository 110. The annotation component 112 further receives a position value and data from the annotator 106. The position value identifies one or more of the positions within the timeline for the content 102. The data defines an interactive object for association with the position identified by the position value. The position value and data are stored as metadata 104 in a memory area such as the repository 110, along with the content 102. In the example of FIG. 1, the content 102 is stored separately from the metadata 104.

Alternatively or in addition, the annotation service 108 automatically suggests position values and corresponding interactive objects to the annotator 106. The annotation service 108 may suggest these values and objects to the user based on factors such as the conversion rate of particular position values and interactive objects (e.g., positioning within the content or type of interactive object). For example, the annotation service 108 may collect and maintain data on the conversion rate for different interactive objects (e.g., click-through rate, products purchased, advertisement impressions rendered), and suggests particular position values and interactive objects based on an analysis of the maintained data.

The content may be explicitly tagged with keywords or tags that describe the content, or a service may scan the content and implicitly identify keywords based on the context of the content. The annotation service 108 uses the keywords to identify and suggest interactive objects. In such an embodiment, the annotation service 108 is aware of relationships (e.g., empirically or specified by a user) between keywords and particular interactive objects. The annotation service 108 may also rank the available interactive objects as a function of the effectiveness of the interactive objects at enticing playback users such as playback user 107 to request a transaction (e.g., conversion rate). For example, a video about waterskiing may be tagged with keywords such as "skiing," "boat," "lake," or "water." The keywords are associated with a position value specified by the annotator 106. The annotation service 108 suggests interactive objects based on the keywords as described above. The annotator 106 selects from the suggested interactive objects, and the selected interactive object is associated with the position value associated with the keywords. In this manner, the selected interactive object is displayed at the position in the video corresponding to the associated position value.

In some embodiments, the annotation service 108 includes basic video editing techniques to enable the annotator 106 to modify the content 102 to be annotated. The annotation service 108, according to an aspect of the disclosure, provides standard annotation types such as a template, standard styles, locations for the interactive objects, shapes, and the like.

Although metadata 104 is described as being stored separately from content 102, the metadata 104 may be stored separately from the content, or embedded, encoded, or otherwise integrated with the content 102. The metadata 104 may be located, for example, in a header associated with the video. According to such an embodiment, the embedded content is provided to the playback user 107 for rendering. The embedded content is in a format capable of being interpreted and rendered by a media player or other playback logic capable of interpreting the embedded content.

In an embodiment, the metadata 104 illustrated in FIG. 1 defines a plurality of interactive objects and corresponding timeline positions for a particular item of content 102. Further, the content 102 and metadata 104 may correspond to a plurality of items of content and associated metadata 104. In such embodiments, a content identifier is received from the annotator 106, inferred from the content 102 itself, or otherwise assigned to the content 102. The content identifier is stored in the repository 110 to identify the content 102 and associated metadata 104.

As shown in FIG. 1, in some embodiments, annotated content 102 is stored in the repository 110. The annotated content 102 may be referenced by an associate 114 or other entity via a reference. Associate 114 may be an affiliate that is participating in affiliate marketing with one or more websites. As is known in the art, affiliate marketing is a network based marketing practice in which a business rewards one or more affiliates based on traffic that the affiliate directs to the business, in some embodiments. For example, the business may reward the affiliate for the number of users that the affiliate directs to the business's website or based on a portion of the revenue generated by users that are directed to the business's website, or both. The annotation component 112 provides this reference to the annotated content 102 for inclusion in an electronic document accessible by the playback user 107. For example, the reference may be a hyperlink to the annotated content 102 in the repository 110. For example, in some embodiments, associate 114 provides a hyperlink to the annotated content via a web page accessible by the playback user 107. In other embodiments, the annotated content 102 is provided to another memory area for storage (e.g., a memory area associated with the playback user 107 or with the associate 114).

The associate 114, host, or other user or service communicates with the playback user 107 (e.g., a second user) and an interface component 116. The associate 114 includes, for example, a business partner or other entity that cooperates with a sales entity such as an online merchant to market and sell goods and/or services, such as described in U.S. Pat. No. 6,029,141 entitled "Internet-Based Customer Referral System" by Bezos et al. In an embodiment, the associate 114 hosts a retail web site, a blog web site, a video or picture hosting web site, a social networking web site, or a search engine, among many other possibilities. Regardless of the type of content that associate 114 provides, according to some embodiments associate 114 provides a web page that also displays the annotated content 102 to users browsing the web pages of the associate 114. The metadata 104 of the annotated content 102 includes hyperlinks directing web traffic to a web page of the online merchant.

For example, according to an embodiment, the interface component 116 (e.g., a web server) receives a request from the playback user 107 to render or otherwise reproduce the content 102 stored in the repository 110. The interface component 116 accesses the repository 110 to provide the content 102 with annotations to the playback user 107. The playback user 107 renders the content 102 in a media player or other application capable of rendering the content 102. In some embodiments, the media player is embedded in a web browser application. One or more interactive objects are provided to the playback user 107 at the identified position in the timeline during the rendering.

During playback of content 102, the playback user 107 may interact with the interactive object displayed at the specified position within the content. The interaction includes, for example, clicking on a hyperlink, hovering a mouse cursor over an interactive object, providing data to the interactive object, selecting data from the interactive object, or any other user interaction with the interactive object. A transaction component 118 is responsive to the interaction from the user. The transaction component 118 may reside and be executed as part of a web server associated with the associate 114, the repository 110 and/or as a portion of a computing system of the playback user 107, or some combination thereof, among other possibilities. The transaction component 118 receives, via the interaction, a request from the playback user 107 for a transaction associated with the interactive object. The request may originate, for example, when the playback user 107 selects a hyperlink associated with the interactive object. The transaction component 118 performs the transaction with the playback user 107 responsive to the received request. The transaction includes, for example, displaying a web page to the playback user 107. The web page may correspond to an item or collection of items, such as products or a category of products, that are displayed to the playback user 107. The web page may be selected by the annotator during annotation, or selected by the transaction component 118 responsive to the request from the playback user 107. For example, the transaction component 118 selects the additional content 109 (e.g., the web page) for rendering based on the interactive object originating the request from the playback user 107.

In another example, the interactive object is an advertisement for an item in an electronic product catalog. The interactive object is hyperlinked to a description of the item in the electronic product catalog. During playback of the content 102, the transaction component 118 receives a request from the playback user 107 to purchase the item (e.g., the playback user 107 clicks on the advertisement) and performs the purchase with the playback user 107 responsive to the received request.

According to another example, the content 102 has contextual keywords (e.g., keywords describing a product) associated therewith. The transaction component 118 selects the additional content 109 as a function of the contextual keywords. For example, the transaction component 118 selects, as the additional content 109, products in a product catalog or advertisements relevant to the keywords. Alternatively or in addition, the selected additional content 109 may include results from a search engine using the keywords as query terms, a list of other content items corresponding to the keywords (e.g., a list of videos also showing a particular product, or a list of videos showing a particular person), or other content appropriate for the playback user 107 based on the keywords (e.g., a list of relevant communities, lists, reviews, products, or product categories).

The additional content 109 is provided to the playback user 107 for reproduction. The additional content 109 may be obtained and provided to the playback user 107 by the transaction component 118, or the playback user 107 may be redirected to the additional content 109.

In an embodiment, one or more of the annotation component 112, the interface component 116, and the transaction component 118 execute on a computing device associated with the sales entity or online merchant.

Figure 2:
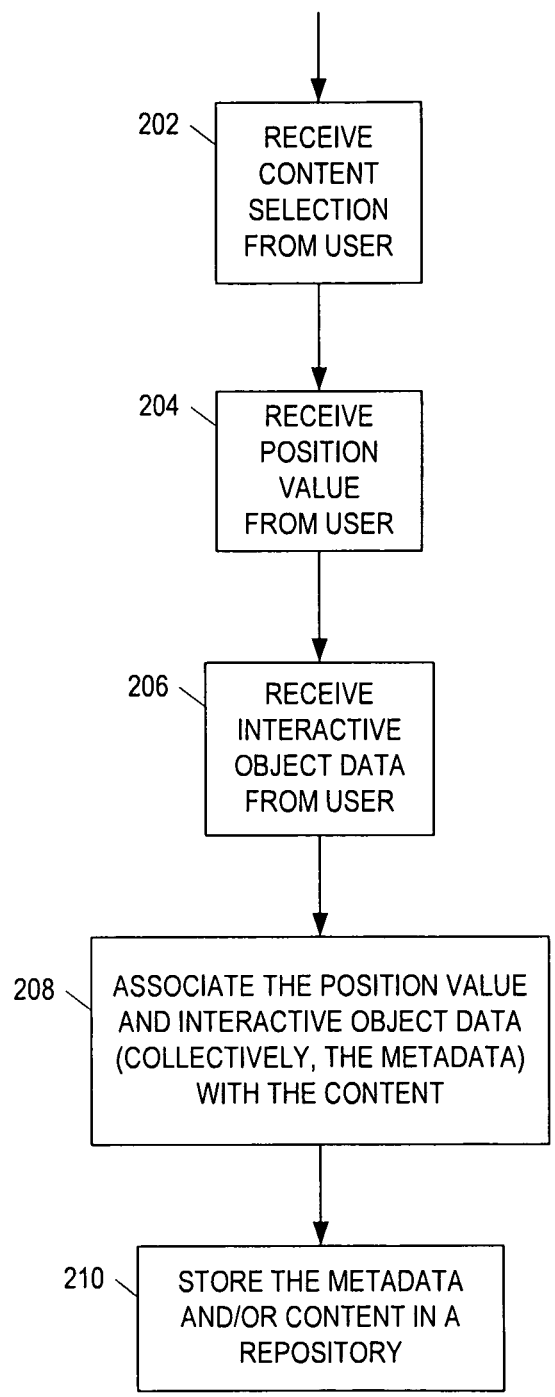
FIG. 2 is an example flow chart illustrating content annotation.

Referring next to FIG. 2, an example flow chart illustrates content annotation. In an embodiment, the operations shown in FIG. 2 are executed by a processor. At 202, a content selection is received from a user. The user uploads the content from a computing device of the user, or selects the content from hosted content in a repository such as repository 110 or other memory area. At 204, a position value identifying at least one position in a timeline associated with the selected content is received from the user. In an embodiment, the position value is measured in seconds or a fraction thereof and represents a time-based offset from the beginning of playback of the content. The position value may also correspond to, for example, among others, one or more of the following: a time value relative to the start of the rendering, an elapsed time value relative to the start of the rendering, a percentage completion value relative to a duration of the rendering, and a memory size value (e.g., memory consumed by the content rendering operation). In an embodiment in which the content includes a multi-chapter video, the position value includes an offset relative to the start of a chapter. The position value may also indicate an end position that signifies a point in the timeline to stop the association of the interactive object with the portion of content.

At 206, data defining an interactive object is received from the user. The data may include, for example, a product identifier. The interactive object corresponds to a portion of the content associated with the identified position in the timeline. At 208, the position value and the received data are associated as metadata with the content. At 210, the metadata and/or content are stored in a memory area such as repository 110 in FIG. 1. For example, the position value and received data such as a product identifier are stored as a name-value pair or other tuple (e.g., <offset time, product identifier>). In an embodiment, the tuple is referred to as a cue point. One or more cue points are defined for each item of content.

One or more sets of cue points (e.g., position value and interactive object pairs) are defined for each item of content. In some embodiments, a particular item of content may be annotated by different annotators (e.g., associates). Separate copies of the content item may be embedded with each set of cue points, or a single copy of the content item may be stored separately from the plurality of sets of cue points. Each set of cue points may be uniquely identified, for example, by an identifier associated with each annotator (e.g., an associate identifier).

After the content 102 is annotated with interactive objects and position values, a reference is provided to the associate for inclusion in an electronic document (e.g., a web page) in an embodiment in which the annotated content is stored remotely from an associate or other host. The reference may be, for example, a uniform resource locator (URL) or portion of code to be embedded in the electronic document. Upon selection of the URL or by execution of the portion of code by a playback user in the electronic document, the interactive object is provided at the position in the timeline during rendering of the annotated content from the electronic document.

In an embodiment (not shown), the data defining the interactive object includes a location value. The annotator specifies a location value identifying a location or area within the portion of the content for the interactive object. For example, the location value identifies a location in a video frame for displaying the interactive object. Alternatively or in addition, the location value identifies a dedicated area of the video frame for displaying all interactive objects.

The location value may correspond to a tuple such as an <x,y> value identifying a location within the portion of the content to display the interactive object or an <x,y,width,height> value identifying the location of the interactive object along with a width and height of the object. Alternatively or in addition, an orientation of the interactive object may be specified. In a video embodiment, the location value identifies an area within a video frame to display the interactive object (e.g., top right corner, across the bottom of the frame, in the center of the frame, in a particular <x,y> location). In an embodiment in which the location value corresponds to an <x,y> value, the <x,y> value represents a pixel offset from a corner of the video frame. The location value is stored as part of the metadata for the content (e.g., in the repository 110 in FIG. 1).

Additional properties relating to the interactive object may be provided such as a degree of transparency, font color, size, any animation association with the interactive object, and duration of display. The duration may correspond to two or more of the positions within the timeline for the content.

Figure 3:
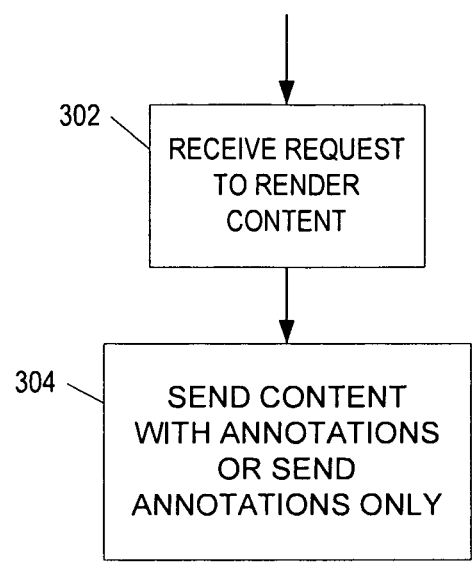
FIG. 3 is an example flow chart illustrating the rendering of annotated playback.

Referring next to FIG. 3, an example flow chart illustrates the rendering of annotated content. For example, when a playback user visits a web site of an associate, the playback user renders the annotated content, for example, via a web browser or other software enabled to play the content. In a video embodiment, various identifiable items (e.g., the interactive objects) such as products are displayed with the video as the video is being rendered (e.g., a clickable thumbnail for a product is displayed). According to some embodiments, when the playback user selects one or more of the interactive objects, the playback user is directed via a reference (e.g., in metadata 104 in FIG. 1) to, for example, an electronic catalog where the playback user may view the associated item for purchase or other consumption. As described in FIG. 4 below, revenue generated from the purchase or other conversion is shared with the associate.

In FIG. 3, a request to render annotated content is received at 302. At 304, the requested content is provided to an associate for delivery to a playback user. In some embodiments, the content is provided directly to the playback user. The content with annotations may be provided to the associate or playback user, or the metadata (e.g., the annotations) without the content may be provided. In the latter, the content may be stored locally (e.g., on a computing device of the playback user) and a media player executing on the user's device synchronizes playback of the content with the metadata to render the interactive objects at the appropriate time. The interactive objects may provide purchase opportunities for products or services, but may also provide hyperlinked text for display to the user.

A media player or other playback logic executing on a computing device of the playback user receives the annotated content and displays the content and annotations to the playback user. In an embodiment, the content is stored local to the computing device, and only the annotations are received. The media player synchronizes the content with the annotations. For example, the media player may be multi-threaded where one thread controls the rendering of the content and another thread controls the receipt and rendering of the annotations. The annotations may be received entirely or in part over time (e.g., lazy loading in the background) as an array or list of position values and corresponding interactive objects. In this example, the thread handling the content rendering checks regularly (e.g., every 0.25 seconds) with the thread handling the annotations and compares a current playback time with the position values (e.g., time offsets) to determine whether one of the annotations should be rendered. The annotations may be rendered as overlays, popups, hovering popups, or the like. In some embodiments, the annotations are rendered in an area of the user interface that is separate from the content being rendered.

Example scenarios for annotated content are next described. Content items that may be annotated include, for example, videos, image slideshows, audio, and sequences of still videos.

Although embodiments of the present disclosure are described in terms of annotating content with references to products in a product catalog, the concepts are applicable to many other contexts. For example, users may annotate content with many other interactive objects that represent and reference profiles on a dating service or social networking web site, family photo albums or movies on a family web site, or news articles at a news web site, among many other possibilities. According to an example, the content may be a video comprising clips of a social gathering. An annotation service such as annotation service 108 in FIG. 1 may be used to annotate portions of the video corresponding to a social networking profile of various users depicted in the video during the designated portion of the video. According to such an embodiment, the interactive objects may be, for example, thumbnail images (e.g. of a user or an avatar) corresponding to the social networking profile. The thumbnail images are displayed during the time defined by its position values. Upon selection of the thumbnail images by the playback user, the playback user is directed to the social networking profile on the social network web site. Likewise, according to another embodiment, the content may be user generated video clips related to news and/or current events. According to such an embodiment, the annotation service is used to annotate portions of the video clips with interactive objects that link to relevant news articles hosted by a web site. The interactive objects may be represented by thumbnail images of the article or images related to the article. The playback user selects the links and is directed to the full content of the news articles.

Figure 4:
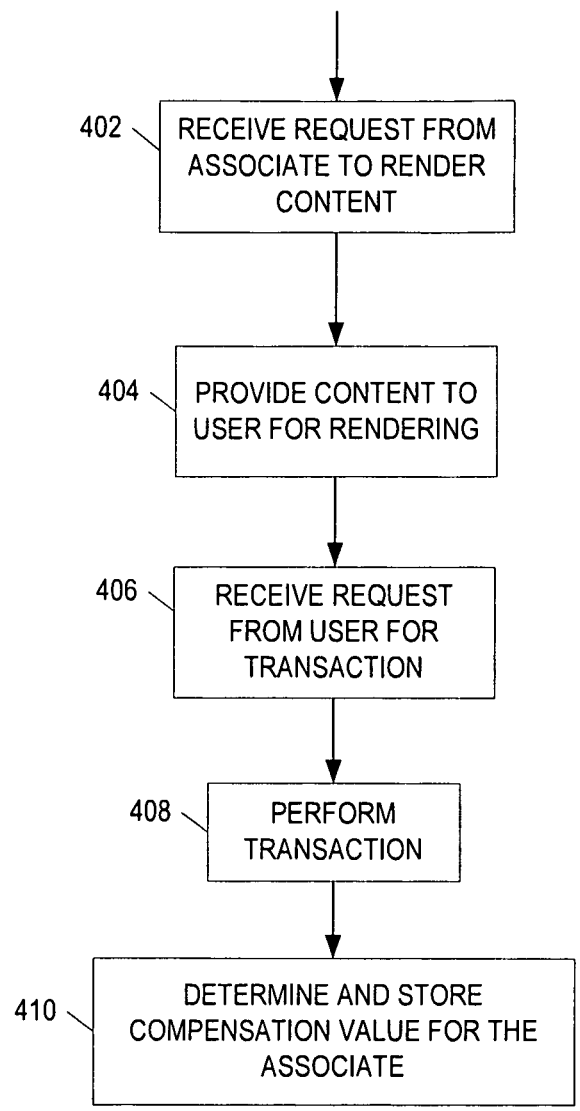
FIG. 4 is an example flow chart illustrating revenue sharing for transactions resulting from annotated content.

Referring next to FIG. 4, an example flow chart illustrates revenue sharing for transactions resulting from use of annotated content. According to an example embodiment, associate 114 hosts a web server and provides an interface, such as through embedded playback software, to playback user 107 upon playback user 107 requesting a web page having the annotated content. At 402, a request to render content to a user is received at the repository from an associate. For example, this might be triggered when a user selects an option to play back the annotated content via a play button on the web page. As described above, the content has a timeline with a plurality of positions. The content also has metadata annotations associated therewith that define additional content (e.g., via interactive objects) associated with portions of the content corresponding to one or more of the positions in the timeline. At 404, the content is provided to the user for rendering in response to the received request. The additional content is provided to the user via the metadata annotations at the corresponding position in the timeline during the rendering. At 406, a request is received from the user for a transaction associated with the additional content. In an embodiment in which the interactive object includes a purchase opportunity for a product, the request received at 406 includes a request to purchase the product. At 408, the requested transaction is performed (e.g., the purchase is completed), and a compensation value for the associate is determined and stored at 410. For example, the compensation value is stored in a data structure (e.g., a file) for the associate via an associate identifier. The associate identifier is received, for example, as a value in a query string in a hypertext markup language request for the transaction. The stored compensation value for each associate may accumulate over time as additional revenue sharing transactions occur. The accumulated compensation is provided to the associate periodically, regularly, or on demand (e.g., weekly, monthly, or per transaction). The compensation may be a percentage or fixed sum associated with the purchase of the item.

Alternatively or in addition, an author of the content and/or an author of the metadata annotations may be compensated. Further, a site hosting the content may also receive some compensation in an embodiment. Any allocation of compensation among the parties (e.g., some, all, or none for each) is within the scope of aspects of the described embodiments. Thus, a portion of the commissions may be split between a user who generated and uploaded content to repository 110, the annotator 106, the associate 114, and a host of repository 110.

A revenue sharing plan may be defined to determine the allocation of compensation to the parties. This revenue sharing plan may be defined as a function of one or more of the associate identifier, the additional content, a product, and the transaction. The compensation values for the parties may be determined as a function of the revenue sharing plan.

Although embodiments are described in the context of sharing revenue based on the purchase of an item, other types of conversions are also contemplated. For example, in some embodiments, performing the transaction includes any form of consumption (e.g., rentals, leases, digital downloads of media content, etc.) and any type of conversion such as, among others, one or more of the following: performing a financial transaction, completing a product purchase, completing purchase of a service (e.g., video rental), displaying a web page, accepting a product or service review from the user, and opening a user account. Further, the transaction may also compensate a party (e.g., the content author, annotator, host, or associate) for directing traffic to a web site (e.g., where advertisements are displayed), where actual purchase of a product is not involved. For example, if a web site hosting the additional content generates revenue primarily from advertising it may be beneficial to measure the revenue sharing based on click-throughs or other page impression statistics that resulted from the referral from the associate web page. Alternatively or in addition, the transaction may also compensate a party when the transaction results in the purchase of a product other than a product that was referred to by the interactive object in the annotated content.

The compensation value may be determined as a function of a category associated with a purchased product. For example, high margin products have larger associated compensation values, while lower margin products have smaller associated compensation values. The compensation values may be absolute values (e.g., $2 for each conversion) or percentages (e.g., 10% of the purchase price of the product).

In an advertisement embodiment, the compensation value may be determined on a per-click or per-impression basis. For example, the transaction directs the user to a web site where advertisements are displayed. Compensation may be allocated for each advertisement impression. Compensation may also be allocated if the user clicks through any of the displayed advertisements. Alternatively or in addition, contextual keywords associated with the interactive object may be auctioned off to generate additional revenue.

Compensation may be considered for the associate or another party during the session in which the user requests the transaction, or over the course of several sessions (e.g., via cookies). In an embodiment, an expiration date terminates the window of consideration for compensation. Further, the compensation may be considered across media players as well. For example, the user may request a transaction on a computing device at work, but actually complete the transaction on a computing device at home.

Figure 5:
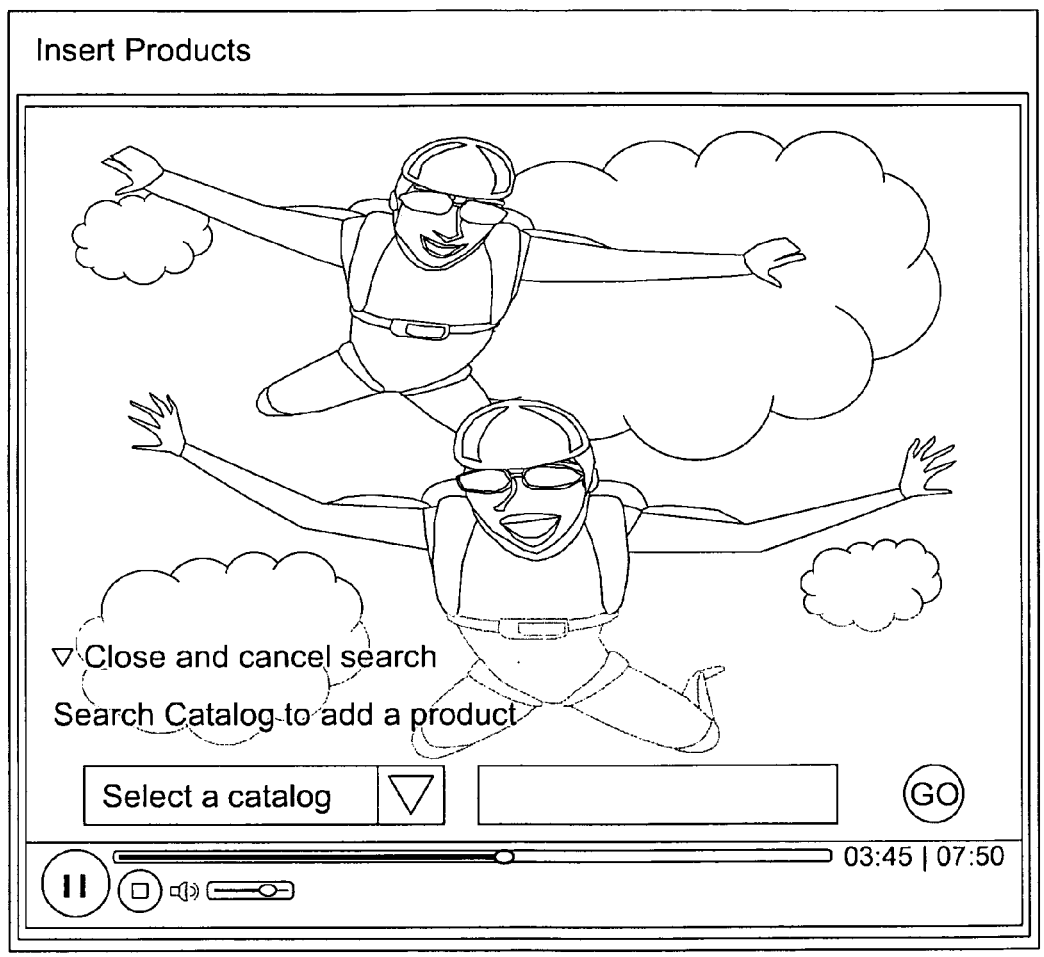
FIG. 5 is an example portion of a graphical user interface illustrating the selection of a product for association with a selected portion of content.
Figure 6:
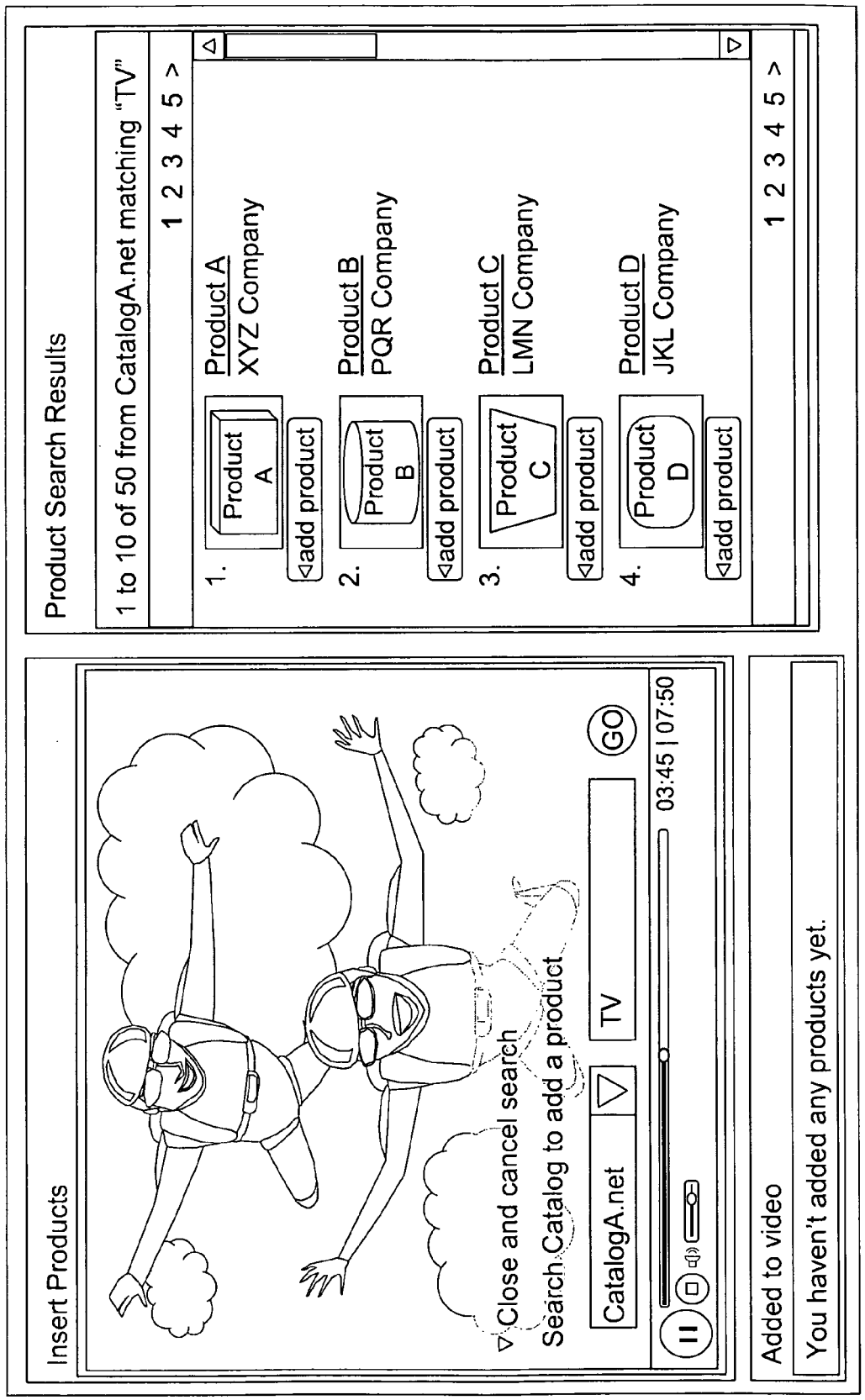
FIG. 6 is an example portion of a graphical user interface illustrating a list of products for selection by a user for association with a selected portion of content.

Referring next to FIG. 5 through FIG. 8, screen shots illustrate an example user interface for receiving a selection of content to be annotated and receiving metadata (e.g., position values and data defining interactive objects) from the annotator. The content is stored in any format capable of being interpreted by a media player. In the examples of FIG. 5 through FIG. 8, the selected content to be annotated is provided to the annotator for rendering from a repository such as repository 110 in FIG. 1. Alternatively or in addition, the content is uploaded by the annotator to a service such as the annotation service 108 in FIG. 1. According to the examples of FIG. 5 through FIG. 8, the annotation service uses a web-based interface for interacting with the annotator. According to some embodiments, the position values and associated interactive object data are provided by the annotator while rendering (e.g., playing) the content via the web interface. For example, during rendering, the annotator presses a "stop" or "insert" button at a desired location in the timeline of the content to stop playback and initiate the process for inserting an interactive object at that location. FIGS. 5 and 6 illustrate one interface that allows the annotator to select items from an electronic catalog. For example, according to FIG. 5, the annotator is selecting from a catalog of products offered by a merchant. However, in other embodiments, the electronic catalog may comprise news articles or user profiles as described above. After identifying a portion of the content that is to be associated with identifiable items such as products or items linked to a web site, the annotator selects the products or items from, for example, the catalog. In an embodiment, a user interface is displayed to enable the annotator to search for the products or items. After viewing the search results, the annotator selects the products or items. The data defining the interactive object corresponds to the selected products. The depicted user interface provides a search mechanism for finding products in the catalog, but any other discovery means may be used such as attribute based browsing and searching.

After selection of the products, a visual indication of the annotation appears to the user. For example, a notch corresponding to the annotation appears on the timeline for the content. Subsequently (not shown), the annotator is able to delete or modify (e.g., move) the notches on the timeline through the annotation service thereby modifying the placement of the annotations along the timeline of the content.

Figure 7:
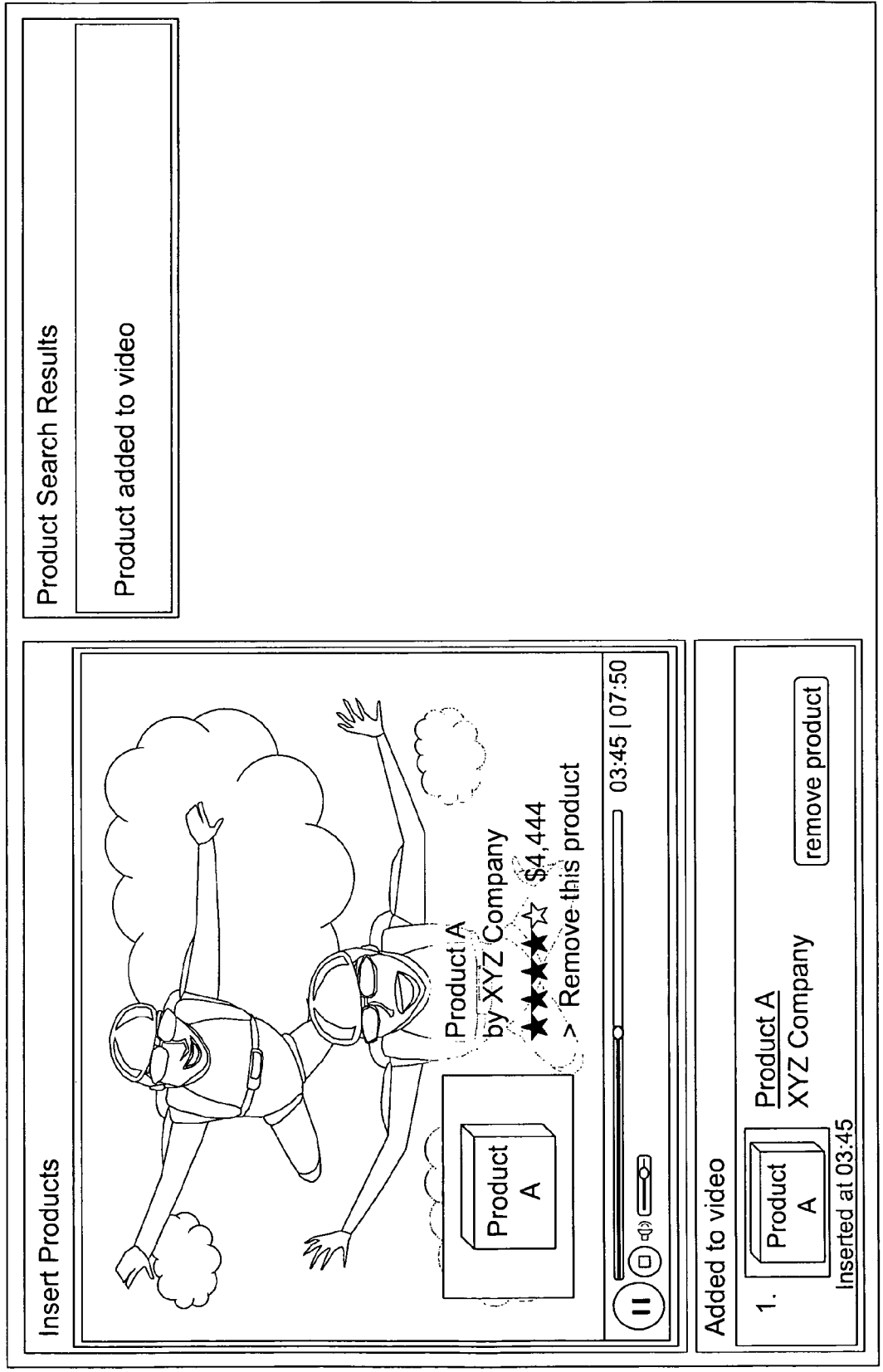
FIG. 7 is an example portion of a graphical user interface illustrating a selected product for association with a selected portion of content.

In particular, FIG. 5 is an example screen shot illustrating the selection of a product for association with the selected portion of content. FIG. 6 is an example screen shot illustrating a list of products for selection by a user for association with a selected portion of content. FIG. 7 is an example screen shot illustrating a selected product for association with a selected portion of content. After the content has been annotated by the user, the annotation service stores the annotations in association with the content in a memory area such as repository 110. This annotated content is made accessible remotely by others. In particular, according to some embodiments, an associate is provided with a snippet of code such as, for example, hypertext markup language (HTML) or JAVA, which may be embedded within their web pages. The code references the annotated content to be displayed upon a user's visit to the associate's web page. This code may, in some embodiments, refer not only to the content, but also to a player that may be used to play the content within a user interface of the playback user (e.g., web browser or the like).

FIG. 8 is an example user interface illustrating a hyperlink to annotated content for inclusion in web page that is provided to the annotator by the annotation service. In an embodiment, the hyperlink or other embedding code is specific to each associate (e.g., includes the associate's identifier). As described above, alternatively or in addition, embodiments provide script, code, applets, or other logic for referencing the annotated content from a web page or other electronic document. The annotator or host copies the embedding code in a web page to create the reference to the annotated content.

In an embodiment, a profile and statistics are maintained on each annotator. For example, the profile may stored a list of all videos that a user has uploaded along with a status associated with each (e.g., ready to be annotated, annotated, deleted, inactive, ready to go live, etc.) such as shown in FIG. 9. Such a profile and associated statistics may be stored, for example, within a memory area such as repository 110.

Figure 10:
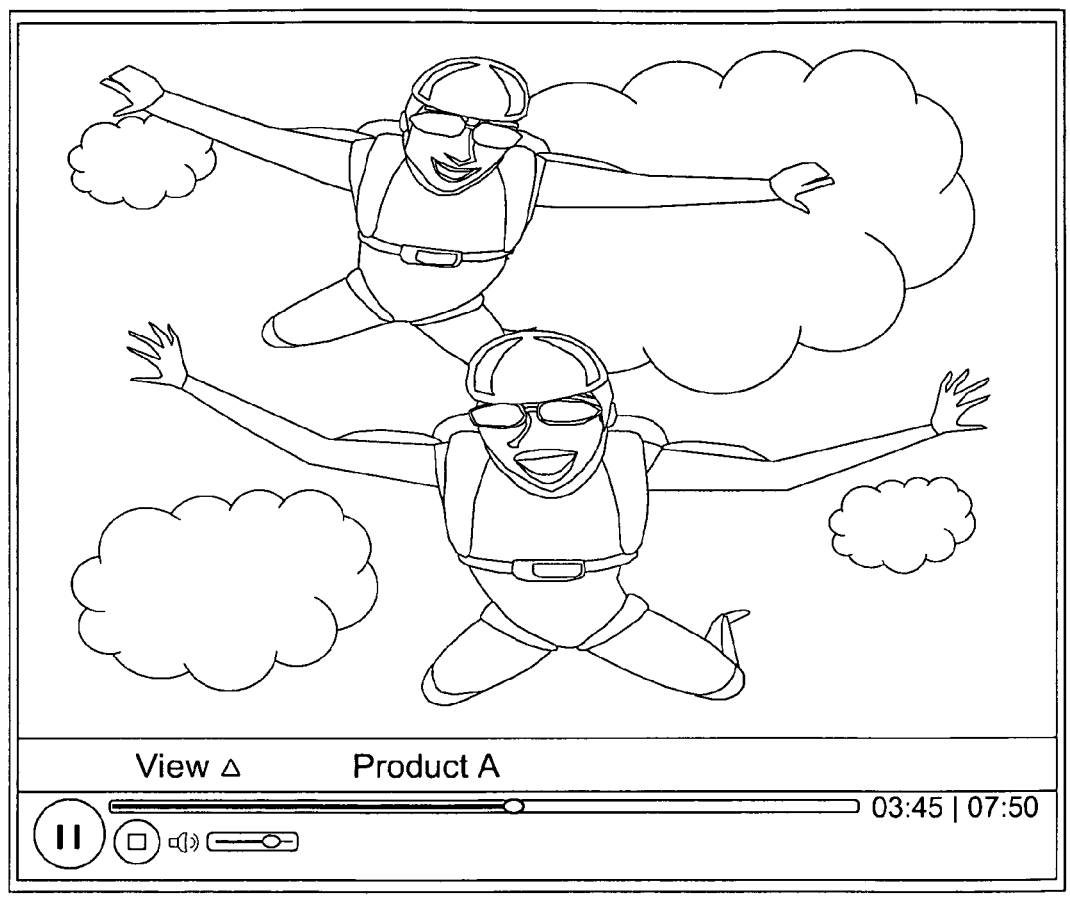
FIG. 10 is an example portion of a graphical user interface illustrating the display of interactive data for a product within annotated content being rendered.
Figure 11:
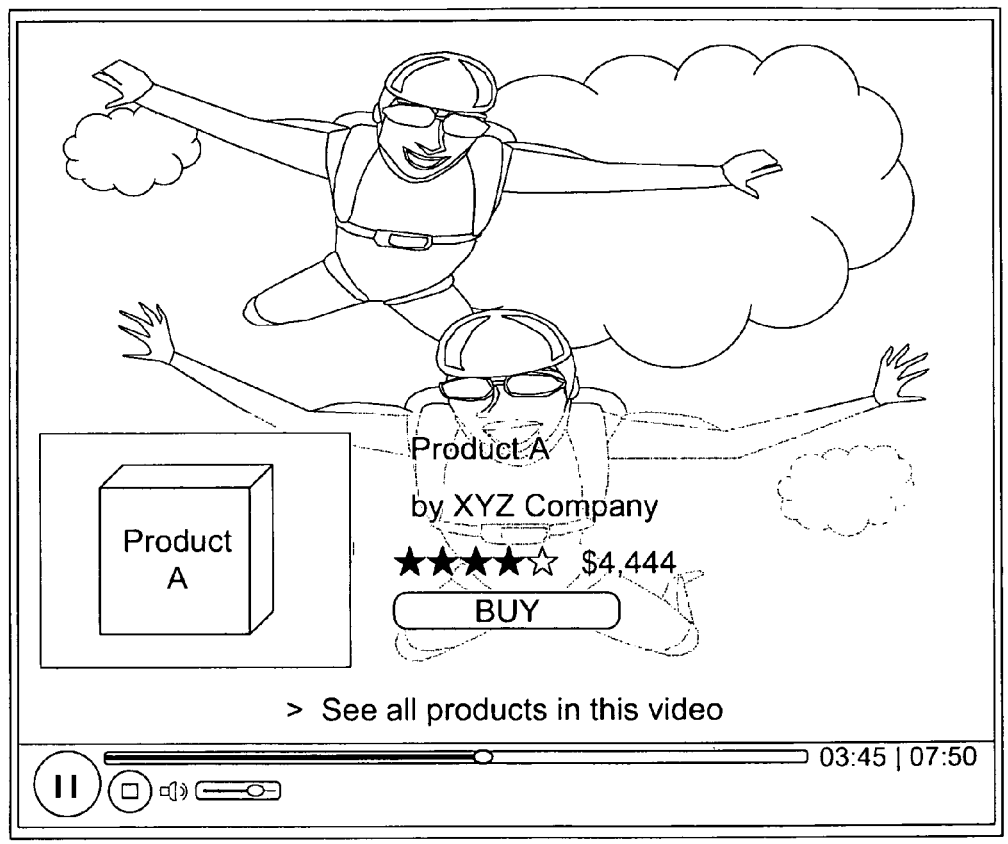
FIG. 11 is an example portion of a graphical user interface illustrating the display of product details and a purchase opportunity for a product within annotated content being rendered.

Referring next to FIG. 10, an example user interface illustrates the resulting display of interactive data for a product within annotated content being rendered. For example, according to such an embodiment, the playback user may be viewing a web page hosted by the associate. The web page includes the snippet of HTML from FIG. 8. In this example, the interactive data appears at the bottom of the video being displayed as a thin line of product information. The information is hyperlinked such that clicking on the line of information will display more information about the product, such as shown in FIG. 11. As depicted, some information about "Product A" is rendered at the time designated by the annotator (and stored as metadata). As more of the video is played, different products are shown in this thin line at the appropriate time. In this example, the product A may be related to skydiving for example.

Referring next to FIG. 11, an example user interface illustrates the display of some product details and a purchase opportunity for a product within annotated content being rendered. In this example, the product information consumes more of the video being rendered relative to the thin line of information shown in FIG. 10. In FIG. 11, the purchase opportunity is also displayed. The purchase opportunity includes hyperlinked text that, upon being selected by the user, directs the user to an online merchant (e.g., destination web site) to enable purchase of the product. For example, the user may be directed to a product detail page, category page, or special offers page. The product information and purchase opportunity may be shown as an overlay or superimposed polygon on the content, and may have varying degrees of transparency to allow or not allow the content underneath the polygon to be viewed by the user. This hyperlinked text may include an identifier that may be associated with the content provider, associate, annotator, repository, or other party that may be participating in the revenue sharing. After selection of this link by a user, a destination web site may use this referral information to track data pursuant to the compensation model. In some embodiments, the user purchases the product from within the context of the content being rendered. For example, data from the online merchant may be displayed in a frame alongside the content being rendered to the user.

Figure 12:
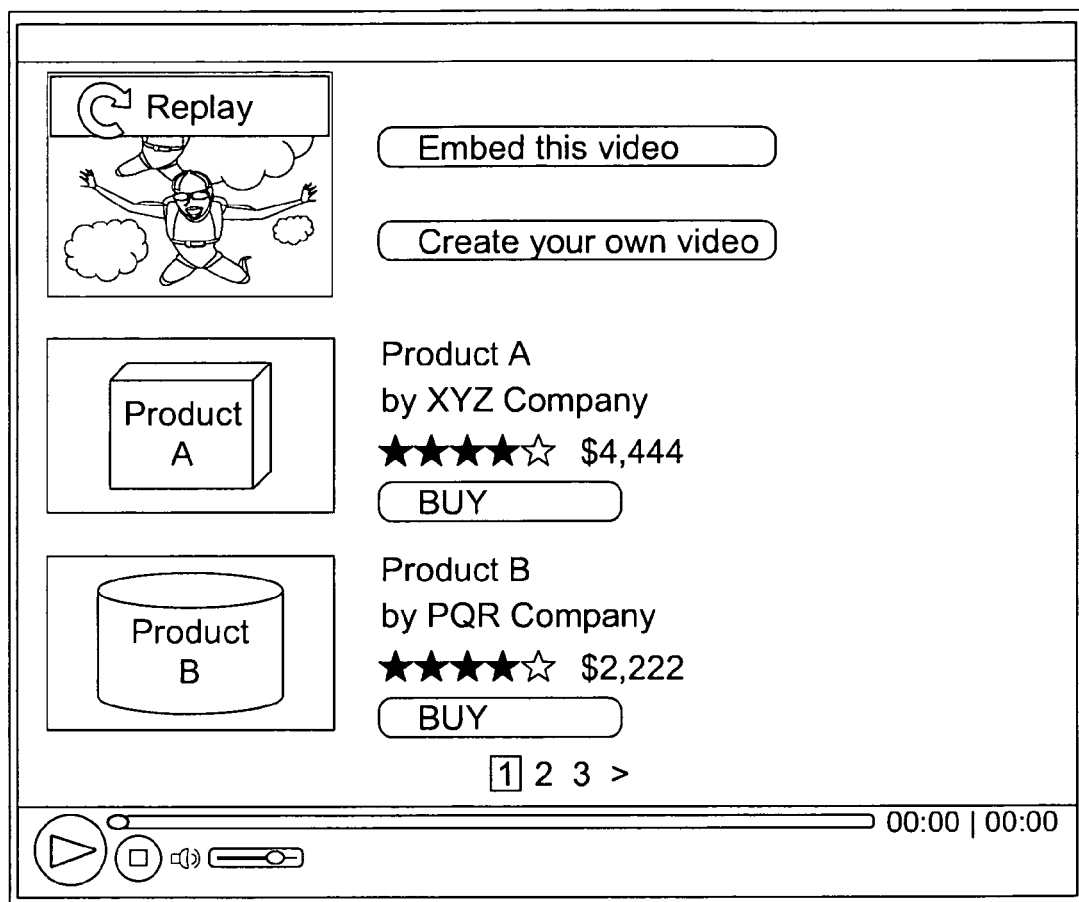
FIG. 12 is an example portion of a graphical user interface illustrating a list of products and corresponding purchase opportunities shown after the rendering of a particular item of annotated content.

Referring next to FIG. 12, an example screen shot illustrates a list of products and corresponding purchase opportunities for an item of content. The list corresponds to the products shown during rendering of the annotated content and may be provided, for example, at the end of playback of the annotated content and/or when a user selects the portion of FIG. 11 entitled "See all products in this video."

Figure 13:
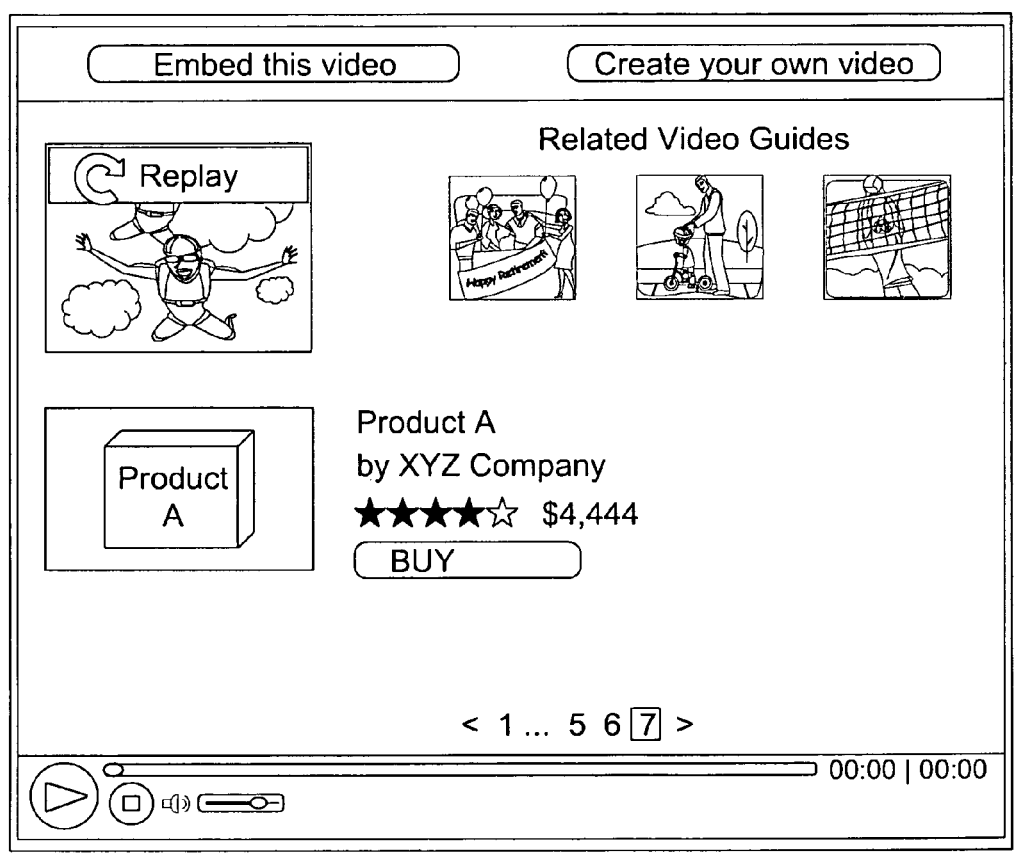
FIG. 13 is an example portion of a graphical user interface illustrating a list of related content along with products and corresponding purchase opportunities associated with a particular item of annotated content.

Referring next to FIG. 13, an example screen shot illustrates a list of related content along with products and corresponding purchase opportunities associated with a particular item of annotated content. This list is shown after the playback of a particular item of annotated content. In this example, the list of related content is determined based on one or more of a plurality of factors including, but not limited to, keywords associated with the annotated content, products within the annotated content, product categories related to products within the annotated content, an author of the annotated content, an author of the annotations, or a host of the annotated content.

Example Operating Environment

A computing device or computer such as described herein has one or more processors and at least some form of computer readable media. Computer readable media, which include both volatile and nonvolatile media, removable and non-removable media, may be any available medium that may be accessed by computer. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

The system memory includes computer storage media in the form of removable and/or non-removable, volatile and/or nonvolatile memory. The computer may operate in a networked environment using logical connections to one or more remote computers.

Although described in connection with an example computing system environment, the disclosed embodiments are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment.

Embodiments herein may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. One or more non-transitory computer-readable media having computer-executable components, said components comprising:
   an annotation component for:
      receiving, from an annotator, a selection of content having a timeline associated therewith, said timeline having a plurality of positions each corresponding to a portion of the content;
      receiving a position value from the annotator, said position value identifying at least one of the plurality of positions within the timeline;
      identifying one or more keywords describing the portion of the content corresponding to the received position value;
      providing a plurality of interactive objects for presentation on an interface, the plurality of interactive objects being associated with the one or more keywords describing the portion of the content corresponding to the position in the timeline identified by the received position value;
      receiving, from the annotator, a selection of an interactive object from the plurality of interactive objects presented on the interface, the selection identifying data that defines the interactive object; and
      associating the received position value and the data with the content to annotate the content; and
   an interface component for:
      receiving a first request from a user to render the annotated content;
      providing the annotated content to the user for rendering in response to the received first request, wherein the interactive object is presented to the user at the identified position in the timeline during the rendering; and
      receiving a second request from the user to select the interactive object during the rendering.

2. The one or more non-transitory computer-readable media of claim 1, wherein the annotation component further ranks the plurality of interactive objects for selection based at least in part on a conversion rate.

3. The one or more non-transitory computer-readable media of claim 1, wherein the annotation component:
   generates a reference to the annotated content; and
   provides the generated reference to an associate for inclusion in an electronic document accessible by the user, wherein the interface component receives the first request from the user via the associate to render the annotated content responsive to an interaction by the user with the electronic document.

4. The one or more non-transitory computer-readable media of claim 1, further comprising:
   a transaction component for:
      receiving a third request from the user for a transaction associated with the interactive object; and
      performing the transaction responsive to the received third request, wherein the interactive object comprises an advertisement for an item in an electronic product catalog, and wherein the transaction component receives the third request from the user to purchase the item and performs the purchase with the user responsive to the received third request.

5. The one or more non-transitory computer-readable media of claim 4, wherein the interface component is associated with an associate, and wherein the transaction component further determines a compensation value for the associate responsive to the performed transaction.

6. A method comprising:
   receiving, from an annotator, a selection of content having a timeline associated therewith, said timeline having a plurality of positions each corresponding to a portion of the content;
   receiving a position value, from the annotator, that identifies one of the plurality of positions within the timeline;
   identifying one or more keywords describing the portion of the content corresponding to the position in the timeline identified by the received position value;
   providing, to the annotator, a plurality of interactive objects for presentation on a user interface, the plurality of interactive objects being associated with the one or more keywords describing the portion of the content corresponding to the position in the timeline identified by the received position value;
   receiving, from the annotator, a selection of an interactive object from the plurality of interactive objects presented on the user interface, the selection identifying data that defines the interactive object; and
   associating the received position value and the data with the content to annotate the content, wherein the interactive object is presented to a user at the position in the timeline identified by the received position value during rendering of the annotated content to the user.

7. The method of claim 6, further comprising providing a reference to the annotated content, wherein the reference is included in an electronic document for rendering the annotated content, wherein the interactive object is presented at the position in the timeline identified by the received position value during rendering of the annotated content from the electronic document.

8. The method of claim 6, wherein associating the received position value and the data with the content comprises:
   embedding the received position value and the data within the content; and
   providing the content with the embedded received position value and the embedded data to the user for rendering.

9. The method of claim 8, further comprising encoding the content with the embedded received position value and the embedded data into a format for rendering by a media player on a device associated with the user.

10. The method of claim 6, wherein associating the received position value and the data with the content to annotate the content comprises embedding the received position value and the data within the content, and further comprising providing the content with the embedded received position value and the embedded data to an associate for rendering to the user upon request by the user.

11. The method of claim 6, further comprising:
   receiving a content identifier for the selection of content;
   storing the received content identifier, the received position value, and the data in a data structure; and
   providing the data structure for use in rendering the interactive object to the user at the position in the timeline identified by the received position value during rendering of the content.

12. The method of claim 6, further comprising providing the user interface for receiving the selection of content, receiving the position value, and receiving the selection from the annotator.

13. The method of claim 6, further comprising providing a catalog of products, wherein the annotator selects one or more of the products from the catalog of products, wherein the data defining the interactive object corresponds to the selected one or more products.

14. The method of claim 6, further comprising providing the content to the annotator for rendering, wherein the annotator selects the position value while the content is being rendered.

15. The method of claim 6, further comprising:
receiving a location value from the annotator that identifies a location within the portion of the content for the interactive object; and
associating the received position value, the received location value, and the data with the content to annotate the content, wherein the interactive object is provided to the user at the location within the portion of the content at the position in the timeline identified by the received position value during rendering of the annotated content to the user.

16. The method of claim 6, wherein the received position value identifies at least two of the positions within the timeline, said two positions representing a duration, wherein the interactive object is provided to the user for the duration in the timeline during the rendering of the annotated content to the user.

17. The method of claim 6, wherein the interactive object comprises an advertisement for an item in an electronic product catalog, and further comprising:
receiving, during rendering of the annotated content to the user, a request from the user to purchase the item; and
performing the purchase with the user responsive to the received request.

18. The method of claim 6, further comprising:
receiving a request from an associate to render the annotated content to the user;
providing the annotated content including the interactive object to the user for rendering responsive to the received request;
receiving a request from the user for a transaction associated with the rendered annotated content;
performing the transaction with the user responsive to the received request; and
determining a compensation value for the associate responsive to the performed transaction.

19. A method comprising:
receiving, from an annotator, a selection of content having a timeline associated therewith, the timeline having a plurality of positions each corresponding to a portion of the content;
scanning the content to identify a plurality of keywords based on a context of the content;
providing a plurality of interactive objects for presentation on an interface, the plurality of interactive objects being associated with the plurality of keywords based on relationships between the plurality of interactive objects and the plurality of keywords;
receiving, from the annotator, a position value that identifies one of the plurality of positions within the timeline;
receiving, from the annotator, a selection of an interactive object from the plurality of interactive objects presented on the interface, the selection identifying data that defines the interactive object; and
annotating the content by associating the received position value and the data with the content.

20. The method of claim 19, further comprising:
providing a reference to the annotated content, wherein the reference is included in an electronic document for rendering the annotated content; and
presenting the interactive object at the position in the timeline identified by the received position value during rendering of the annotated content from the electronic document.

21. The method of claim 19, wherein annotating the content includes embedding the received position value and the data within the content.

22. The method of claim 21, further comprising providing the annotated content with the embedded received position value and the embedded data to a user for rendering.

23. The method of claim 21, further comprising encoding the content with the embedded received position value and the embedded data into a format for rendering by a media player on a device associated with the user.

24. The method of claim 19, further comprising:
receiving a content identifier for the selection of content;
storing the received content identifier, the received position value, and the data in a data structure; and
providing the data structure for use in rendering the interactive object to a user at the position in the timeline identified by the received position value during rendering of the content.

25. The method of claim 19, further comprising providing the interface for receiving the selection of content, receiving the position value, and receiving the selection from the annotator.

26. The method of claim 19, further comprising providing the content to the annotator for rendering, wherein the annotator selects the position value while the content is being rendered.

27. The method of claim 19, wherein the received position value identifies at least two of the positions within the timeline, the at least two positions representing a duration, wherein the interactive object is provided to a user for the duration in the timeline during the rendering of the annotated content to the user.

28. The method of claim 19, wherein the interactive object comprises an advertisement for an item in an electronic product catalog, and further comprising:
receiving, during rendering of the annotated content to a user, a request from the user to purchase the item; and
performing the purchase with the user responsive to the received request.

29. The method of claim 19, further comprising:
receiving a first request from an associate to render the annotated content to a user;
providing the annotated content including the interactive object for rendering responsive to receiving the first request;
receiving a second request from the user for a transaction associated with the rendered annotated content;
performing the transaction with the user responsive to the receiving the second request; and
determining a compensation value for the associate responsive to the performed transaction.

* * * * *